March 15, 1932.  H. MOLL  1,849,242
REVERSING VALVE
Filed Aug. 23, 1928   2 Sheets-Sheet 1
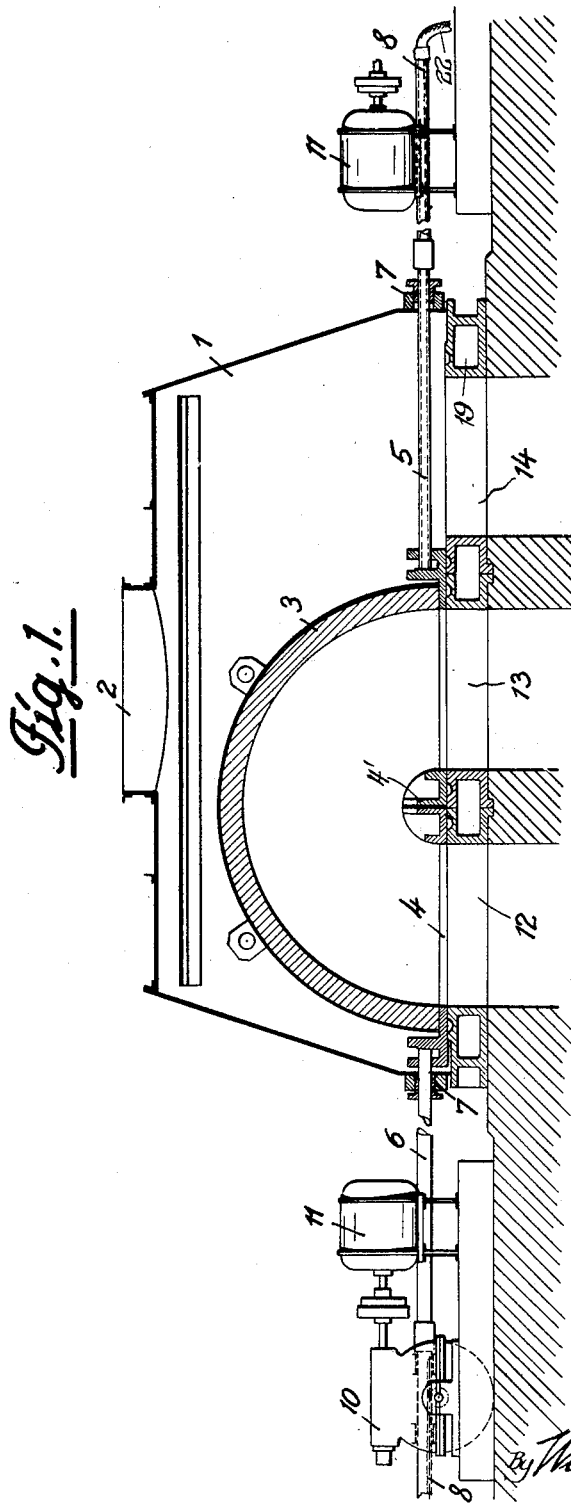
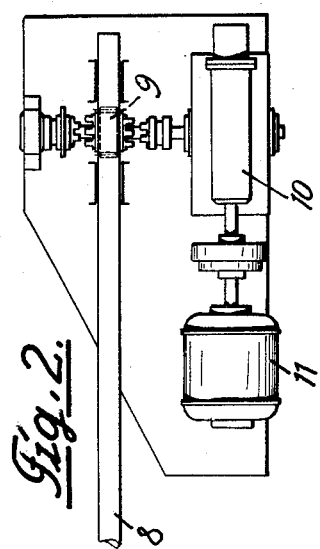
Inventor:
Hermann Moll,
By Wilkinson Huxley Byron & Knight
attys.

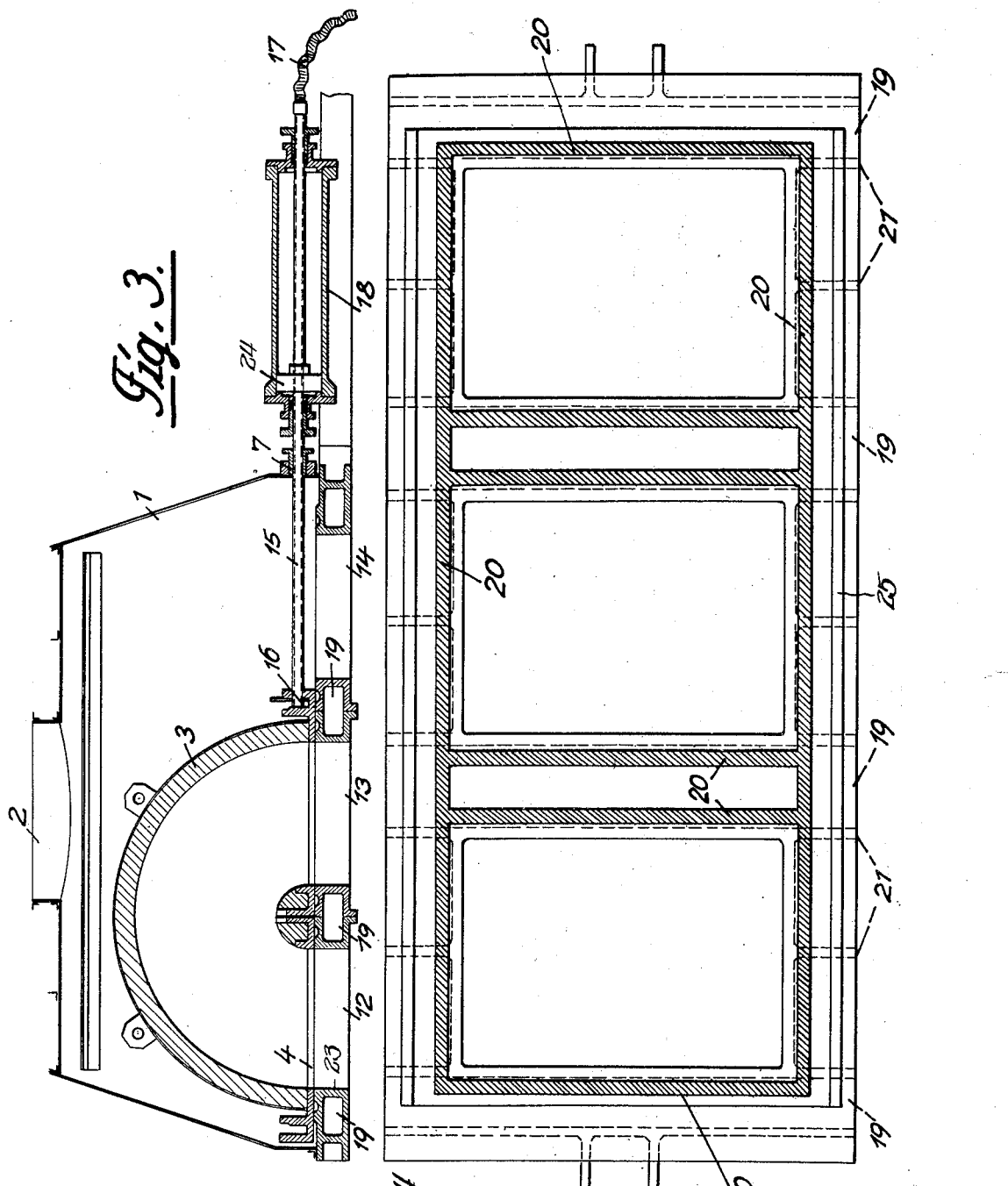

Patented Mar. 15, 1932

1,849,242

UNITED STATES PATENT OFFICE

HERMANN MOLL, OF NEUWIED-RASSELSTEIN, GERMANY

REVERSING VALVE

Application filed August 23, 1928, Serial No. 301,509, and in Germany November 21, 1927.

This invention relates to a new and improved reversing valve and more particularly to a reversing valve of the type especially adapted for use in reversing gas or air flow in connection with regenerative furnaces or the like.

The invention relates particularly to the type of valve in which a sliding valve member or shell is enclosed within an outer casing. In such valves three openings are provided in the base and the movable shell is adapted to connect one of the openings with either one of the other two openings as desired. An additional opening is provided into the casing, this being connected during the use of the valve with the one of the first three openings not covered by the shell, or movable valve member.

In valves of this character the working parts are exposed to high temperatures and the surface upon which the shell or valve member slides is subject to wear. The operating rods or bars extending into the casing are subjected to the high temperatures caused by the flow of gases through the valve.

It is an object of the present invention to provide a valve of this character in which the sliding surfaces may be properly lubricated to minimize wear.

It is a further object to provide a construction in which the valve base and operating rods may be water cooled. It is an additional object to provide a construction in which the valve operating rods may be withdrawn from the valve casing when not actually in use in moving the valve shell.

It is a further object to provide a valve of this character which is simple in design and adapted for commercial production.

Other and further objects will appear as the description proceeds.

Figure 1 is an elevation partly in section showing one form of construction;

Figure 2 is a plan view showing one of the push rod operating assemblies;

Figure 3 is a view similar to Figure 1, but showing a modified form of construction; and Figure 4 is a plan view on an enlarged scale showing the valve base or guide plate.

Referring first to the form of construction shown in Figure 1, the valve casing 1 is provided with the opening or passage 2. This casing 1 rests upon the base plate or guide plate 23. The movable shell 3 is permanently secured to the sliding frame 4, which slides upon the base plate 23. The push rod 5 extends through a bearing 7 in the side of the casing 1 and engages the frame 4. The rod 5 is secured to the rack bar 8, which is reciprocated by the gear 9. This gear 9 is rotated through the gear reduction assembly 10 by power supplied by the electric motor 11. A similar push rod 6 is located upon the opposite side of the casing and is driven in the same manner. It will be noted that the rods 5 and 6 and their rack bars are shown as hollow and provided with a flexible connection 22 for the introduction of cooling fluid.

Referring now to the form of construction in Figure 3, the casing 1, opening 2, shell 3 and frame 4 are identical with those previously described. The base plate 23 is also the same. A different means is shown, however, for reciprocating the shell 3 and frame 4. The hollow push bar 15 is keyed at 16 to the frame 4 so as to move it in either direction. The piston 24 is secured to the outer portion of the bar 15 and this piston is operated within the cylinder 18. The flexible connection 17 is provided for the introduction of cooling fluid. It will be understood that fluid under pressure for operating the piston 24 may be introduced into cylinder 18 by any usual form of valve controlled connections.

The base plate 23, as best shown in Figure 4, is provided upon its upper surface with continuous lubricating grooves 20. These grooves may contain suitable packing saturated with lubricant. The flanges 25 are provided for guiding the frame 4 in its movement. As clearly shown in Figures 1 and 3, the base plate 23 is provided with the internal passages 19 into which suitable cooling fluid may be introduced. The webs or flanges 21 are further provided to aid in cooling the base plate.

The three adjacent passages 12, 13 and 14 extend upwardly through the base plate and also through the furnace structure supporting the plate. In one form of construction where the valve would be used, the passage 13 would lead to the stack. The passages 12 and 14 are connected to the gas regenerators at the two ends of the furnaces. The opening 2 in the casing 1 is connected to the source of gas supply which may be a gas main leading to gas producers. It will be understood that the construction may be used in connection with the control of air rather than combustible gas and may be used for any other purposes for which they are adapted.

In the form of construction shown in Figures 1 and 2, the push rods 5 and 6 are used alternately. They are used for pushing only and not for pulling, and have no permanent connection with the frame 4 of the valve shell. With the parts in the position shown in Figure 1, the valve shell 3 has just been pushed to the left to reverse the operation of the furnace. The motor driving the rod 5 will then be reversed and the rod withdrawn until its inner end is approximately flush with the inner end of the bearing 7. During this portion of the operating cycle of the furnace the parts will remain in this position. Neither push rod 5 nor 6 is exposed to the heat and erosive action of the gases in the valve casing.

When it is desired to reverse the furnace by moving the valve shell to the right, the left-hand motor thrusts the push rod 6 inwardly until the shell is shifted to cover the openings 13 and 14. The passage 12 is thus put is communication with the passage or opening 2. After the movement is completed the motor is reversed and the push rod 6 withdrawn. In either position it will be noted that the cross frame portion 4' of the frame 4 covers the lubricant containing grooves of that portion of the base plate covered by the shell so that the lubricant is not exposed to the flow of the products of combustion.

In the form of construction shown in Figure 3 the push rod 15 serves to both push and pull the valve shell 3. With the valve shell to the left, as shown in Figure 3, the rod is exposed to the gas flow between passages 2 and 14. The fact that it is water cooled, however, minimizes the effect upon the rod of the gas flow.

I have shown two preferred forms of my invention by way of illustration, but it will be understood that it is capable of further changes and modifications to adapt it to varying conditions, and I contemplate such changes and modifications as come within the spirit and scope of the appended claims.

I claim:

1. In a reversing valve for regenerative furnaces, a casing, a guide plate, a shell slidably mounted on the guide plate within the casing, and independently operable separate push rods provided with means for forcing them within the casing to engage and move the shell.

2. In a reversing valve for regenerative furnaces, a casing, a guide plate, a shell slidably mounted on the guide plate within the casing, and independently operable separate push rods located at opposite ends of the casing, and provided with means for forcing them within the casing to engage and move the shell.

Signed at Neuwied-Rasselstein, Prussia, Germany, this 6th day of August, 1928.

HERMANN MOLL.